Patented Sept. 1, 1942

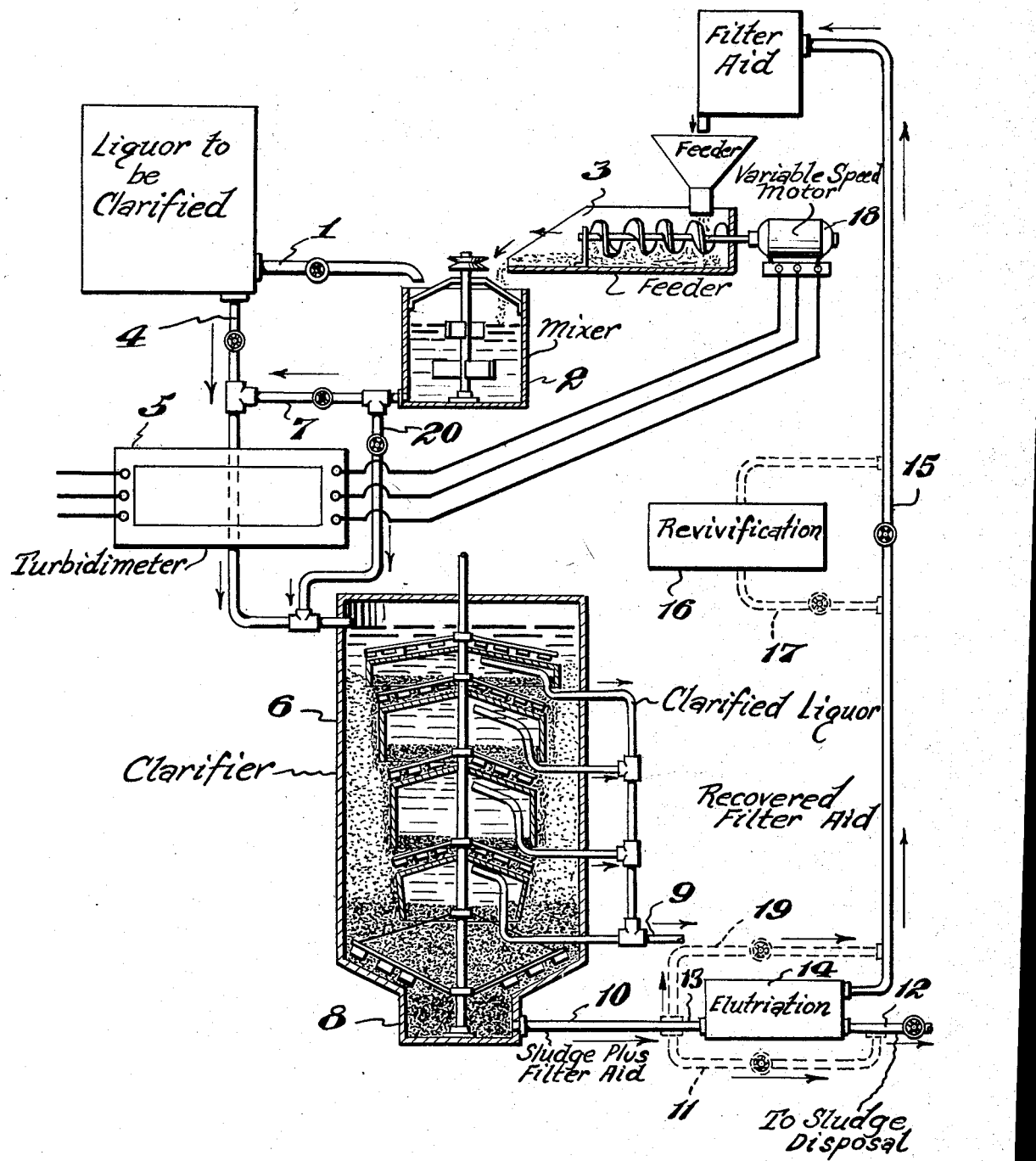

2,294,697

UNITED STATES PATENT OFFICE 2,294,697

CLARIFICATION AND DECOLORATION OF LIQUIDS

John J. Seip, Allentown, Pa.

Application May 13, 1938, Serial No. 207,838

4 Claims. (Cl. 210—42.5)

This invention relates to clarification and decoloration of liquids; and it comprises a process of clarifying and/or decolorizing liquors containing color or solids in suspension, such as those which are encountered in the defecation of cane and beet sugar juices, in the clarification of potable water, etc., said process comprising mixing the liquor to be clarified with a filter aid in proportions producing a substantially constant resulting turbidity or in proportion to the depth of color of the raw liquor, passing this mixture into a clarifying zone and through a bed of sludge comprising a suspension of sludge solids and filter aid in said clarifying zone, the resulting clarified liquor being passed out of an upper section of said zone and the filter aid and entrapped sludge solids being discharged from a lower section of said zone in a direction counter to the flow of the liquor to be clarified, the filter aid being then advantageously separated from the sludge solids and returned to the process or a portion of the mixed sludge solids and filter aid being returned to be reused in the first step of said process; all as more fully hereinafter set forth and as claimed.

In my Patent No. 2,103,829, I have described a process of clarifying liquors containing solids in suspension by the use of a multi-tray clarifier, wherein such a liquor is passed through beds of sludge maintained on the trays of said clarifier in a direction counter to the flow of sludge solids, whereby the liquor is clarified by the resulting sludge bed filtration. In this process use can be made of the multi-tray clarifiers described in my Patents Nos. 2,103,796 and 2,103,828, as well as that described in No. 2,103,829. The present invention represents in some respect an improvement upon the processes described in these acknowledged patents although the same type of clarifying equipment may be used.

In conducting sludge bed filtration in multi-tray clarifiers it has been found that the rate of rotation of the mechanical sweeps should be adjusted to some extent in accordance with the quantity of solids in the liquor to be clarified. In general, the smaller the quantity of sludge in this liquor, the slower the sweeps should be rotated. When liquors containing very small quantities of suspended solids are clarified it has also been found that, for best results, it is desirable to reduce the spacing between the depending flanges and the trays beneath, through which spaces the liquor to be clarified passes in counter-flow to the sludge, since otherwise the sludge may be discharged so rapidly from the sludge bed that the latter becomes less effective in producing the desired filtration effect. The present invention has eliminated the necessity for these adjustments and provides a method wherein the degree of clarification secured is, within certain limits, substantially independent of the quantity of solids carried by the liquor to be clarified, independent of the rate of rotation of the sweeps and independent of the spacing of the trays and flanges. These are new and important results.

I have found that, if the liquor to be clarified is mixed with a so-called filter aid prior to its passage into the clarifier and if the quantity of filter aid added in this manner is large in comparison with the solids which are carried by the liquor, the clarification secured becomes substantially independent of the quantity of solids in the liquor to be clarified. That is, when the rate of rotation of the sweeps has been once adjusted to produce the optimum degree of clarification, neither this rate nor the rate of addition of filter aid requires adjustment, even though the solids content of the liquor to be clarified may vary, if the quantity of filter aid added is at least about equal to the maximum solids content of the liquor to be clarified. Operation in this manner has many obvious advantages.

If it is desired to test a number of liquors in order to determine the maximum degree of clarification which can be obtained with each liquor, these liquors can be passed through a single testing machine provided with a feed of filter aid and the degrees of clarification obtained thereby will be found to correspond substantially to the maximum obtainable, this clarification being obtained without any adjustment of the rate of rotation of the sweeps, etc. A large number of liquors can be tested in this manner in a single machine and in a short period of time without changing any adjustments. Of course, in a final installation, if the liquor to be clarified contains sufficient solids to be clarified without the use of a filter aid, it is possible to dispense with this and, by proper adjustment of the rate of rotation of the sweeps, etc. the same high degree of clarification will be obtained as in the test run. But if it were attempted to test each of several liquors for maximum degree of clarification by making the necessary adjustments of the rate of rotation of the sweeps, etc., this would require a considerably longer time than the method outlined.

I have also found that it is possible to eliminate adjustments of the rate of rotation of the sweeps, etc., with change of solids content of the liquor to be clarified, by the simple expedient of varying the amount of filter aid added in such manner as to keep the factor—filter aid plus sludge solids—at a substantially constant value in the liquor passed into the clarifier, that is, by increasing the quantity of filter aid to make up for any decrease in the solids content of the liquor to be clarified. This result can be accomplished with sufficient accuracy by keeping the turbidity of the liquor after the addition of filter aid at a substantially constant value.

I have found that it is somewhat more simple to vary the feed of the filter aid in accordance with the solids content of the liquor to be clarified than to vary the rate of rotation of the sweeps. And better results are secured by this method. An excess of filter aid does no particular harm, whereas if the speed of rotation should be too high, imperfect clarification might result. It is also possible to regulate the addition of filter aid automatically by connecting up the feed of filter aid to a recording and controlling turbidimeter operating either on the liquor to be clarified or upon the liquor after the addition of the filter aid.

If desired the filter aid can be produced in situ. This is a relatively simple operation. It is merely necessary to introduce chemicals into the liquor to be clarified in such manner that a precipitate will be formed, this precipitate being advantageously of the flocculent type. Precipitates of aluminum hydroxide, ferrous hydroxide or copper hydroxide have been found to be particularly suitable. These can be formed by the introduction of suitable soluble salts of aluminum or iron and precipitating the respective hydroxides by the addition of an alkali, such as soda ash or lime. It is also possible to produce a precipitate of calcium carbonate in situ, for example by the addition of lime followed by the introduction of carbon dioxide or of a suitable carbonate. The best method to be employed in a given case will depend upon the type of liquor which is being clarified, the availability of the chemicals and other circumstances.

The chemicals employed for forming the filter aid in situ can be added either continuously, as the liquor to be clarified is flowing into the clarifier, or a batch process can be employed wherein the chemicals are mixed separately and then added to the liquor to be clarified. Clarification can be accomplished immediately. The continuous process is satisfactory since adequate time is provided for the formation of the desired precipitate while the liquor is passing through the clarifier.

I have found that, in sludge bed filtration, it is not necessary to wait until the flocs have reached their maximum size prior to filtration, which is due, presumably, to the fact that sludge bed filtration is considerably more efficient than the usual sand filters, for example. This fact makes the method of the present invention particularly suitable for the clarification of water for use in laundries, paper mills, etc., where space is at a premium and where it would be impossible to employ large settling basins of the type which are now employed in the clarification of potable water, for example. In the present method it is possible to obtain high clarification merely by mixing the raw water with alum and lime, for example, immediately before passing it through the clarifier. The sludge beds, which in this case consist largely of precipitated aluminum hydroxide, effectively entrap the freshly formed precipitate. It is probable that the sludge beds provide nuclei for the formation of the aluminum hydroxide precipitate or in other words that they serve to "seed" the liquor as it passes through. At least there is no tendency for a subsequent precipitation to occur.

A wide range of filter aids can be employed in my process. In fact any of the commercial filter aids can be employed, such as filter cell, filtrol, etc., as well as infusorial earth, fuller's earth, carbon black, etc. In some cases the sludge recovered from the process can be recycled as a filter aid. It is also possible to add a filter aid and to recycle a portion of the mixed sludge and filter aid in order to reduce the quantity of filter aid required. But it is usually preferred to separate the filter aid from the sludge and to recycle the former only. It is usually possible to separate the filter aid from the sludge by any of the prior art processes involving elutriation.

My invention can be described in more detail by reference to the accompanying drawing which shows, in the form of a flow sheet, several specific embodiments thereof wherein a filter aid is added to a liquor to be clarified and this mixture is passed through a clarifier in which it is subjected to sludge bed filtration, the solids recovered from this process being either discarded as a whole or a portion being recycled after being subjected to one or more operations, all these procedures being indicated on the drawing by appropriate legends.

As indicated on the drawing, the liquor to be clarified may be passed either through pipe 1 to a mixer 2, in which it is mixed with filter aid from feeder 3, or it may be passed directly by pipe 4 through the turbidimeter 5 to the clarifier 6. The liquor may be mixed with filter aid, passing through pipe 7, prior to passing through the turbidimeter or the filter aid may be added through pipe 20 just before the liquor is passed into the clarifier. It is also possible, of course, to mix the filter aid with a small quantity of liquor to be clarified, the bulk of the liquor being passed directly through the turbidimeter. If desired a recording and controlling turbidimeter can be employed or measurements of the turbidity can be taken by hand either before or after mixing with the filter aid. In either event it is advantageous to control the addition of filter aid in accordance with the turbidity of the liquor to be clarified. Ordinarily it is best to add the filter aid in a quantity inversely proportional to the solids content (turbidity) of the raw liquor, that is to add more filter aid the less the turbidity of the raw liquor in order to keep the turbidity of the mixture substantially constant. This furnishes a constant supply of solids to maintain the sludge beds. Of course, this rule may vary to some extent depending upon the relative settling rates of the filter aid and of the sludge solids. It will be noted that this rule is just the opposite from that frequently employed in ordinary filtration installations where the supply of filter aid is increased upon increase of the solids present in the liquor to be filtered.

On the other hand, if the liquor is clear but it requires decoloration, a decolorizing filter aid should be added substantially in proportion to the depth of color of said liquor. In this case the filter aid is passed through line 20 to be mixed with the liquor to be decolorized just before entering the clarifier. The turbidimeter then records the depth of color of the raw liquor and the control can be readily adjusted so that the decolorizing filter aid is fed substantially in proportion to the depth of color of the raw liquor.

In case it is desired to both decolorize and clarify a liquor, this can be accomplished by suitable variations in the procedures outlined above. It will be noted that the use of a decolorizing filter aid in this process accomplishes the double effect of decolorizing as well as clarifying. Without the use of such a filter aid it would be possible to clarify only since the sludge contained in natural waters seldom has any decolorizing effect on the coloring matter contained in the water unless it should happen that this coloring matter can be removed by sludge filtration alone.

The mixture of filter aid and liquor is passed into the clarifier 6, this clarifier being preferably of the type shown in the drawing. In this type of clarifier the liquor to be clarified flows in a central direction through passageways formed between the depending peripheral flanges and the tops of the trays beneath. It is evident that the rate of flow through these peripheral passageways is only a small fraction of that through the passageways in clarifiers provided with a central down-take. This slow rate of flow ensures optimum conditions for the entrapment of sludge particles in the sludge bed. The sludge and filter aid particles which are precipitated on the tops of the trays are slowly propelled towards the peripheral passageways in counterflow to the liquor by means of sweeps and eventually fall off the edges of the trays, collecting in the bottom of the clarifier where they are propelled by sweeps into the sludge trap 8. The clarified liquor is drawn off from the central upper sections of the clarifying zones and passes out of the clarifier through the pipe 9.

The mixture of sludge and filter aid which accumulates in the sludge trap 8 is drawn off by means of the pipe 10. This mixture can be immediately discarded, if desired, through pipe 11 which passes it to pipe 12 leading to a suitable sludge disposal operation. If it is desired to recover the filter aid from the sludge, the mixture of sludge and filter aid may be passed through pipe 13 to a separation zone 14 wherein some type of elutriation or other separation process is conducted. The separated sludge particles may then be sent to sludge disposal through pipe 12 while the filter aid may be returned either directly to the feeder 3 by pipe 15 or through an intermediate revivification step, indicated at 16, by means of pipe 17. Revivification or purification of the solids can be accomplished by a furnacing operation or by an acid treatment, for example. It is also possible to discharge the bulk of the mixed solids by means of pipe 11 to the sludge disposal process, while passing a minor portion by pipe 19 either directly to the feeder 3 or indirectly after a revivifying step. If the sludge is mostly organic material, for example, this can be eliminated by calcination in the revivifying step.

The flow chart shows a variable speed motor 18 for driving the feeder mechanism which may be a worm feed, for example, but any type of variable feed may be employed. The motor may be connected to the turbidimeter controller 5 as indicated, the speed of the motor being controlled to produce either a constant turbidity in the mixture of raw liquor and filter aid or to add filter aid in proportion to the color or the turbidity of the raw liquor. If it is desired to produce the filter aid by chemical precipitation the feeder can be employed for adding a mixture of chemicals, such as alum and lime, which will react to form a flocculent precipitate in the mixer, this precipitate then being mixed with the liquor to be clarified.

While I have described what I consider to be the best embodiments of my invention, it is obvious, of course, that many variations can be made in the procedures which have been outlined without departing from the purview of this invention. It is possible to employ the method of this invention for the clarification and/or decoloration of all types of liquors containing coloring matter or entrained or suspended solids. When used for decolorizing liquors, charcoal, filtrol or other decolorizing agent can be added as a filter aid or in place of the filter aid. It is possible, of course, to employ any of the prior art methods of separating the sludge from the filter aid and of revivifying the spent filter aid. Other modifications which fall within the scope of the following claims will be immediately evident to those skilled in this art.

What I claim is:

1. In the process of clarifying liquors containing suspended solids in varying amount, the steps which comprise suspending additional solids in such a liquor in such proportions that the total resulting turbidity is controlled at a substantially constant value and subjecting the resulting liquor to sludge bed filtration in such manner that the suspended solids in the liquor are entrapped in said sludge bed and serve to maintain said bed.

2. In the process of clarifying liquors containing suspended solids in varying amount, the steps which comprise mixing such a liquor with a filter aid, controlling the addition of filter aid to produce a substantially constant resulting turbidity, passing the mixture to and through a sludge bed of suspended solids, whereby said filter aid and said suspended solids are entrapped in said bed, and discharging solids from said bed through and in counter-flow to the incoming mixture at such a rate that the discharge is substantially equal to the accumulation of said solids.

3. In the clarification and decoloration of liquors containing suspended solids in varying amount, the process which comprises mixing such a liquor with a filter aid, the filter aid being added in an amount at least substantially equal to the maximum solids content of said liquor, passing said mixture to and through a sludge bed of suspended filter aid and sludge solids, whereby the solids in said mixture become entrapped in said sludge bed, and discharging solids from said bed through and in counter-flow to the incoming mixture at a rate substantially equal to the rate at which they accumulate in said bed.

4. In the decolorization of liquors containing coloring matter in solution or suspension therein, the process which comprises mixing such a liquor with a finely divided decolorizing agent and automatically controlling the quantity of decolorizing agent added substantially in direct proportion to the depth of color in the liquor, passing said mixture to and through a suspended bed of said decolorizing agent and discharging said decolorizing agent from said bed through and in counter-flow to the incoming mixture at such a rate that the discharge is substantially equal to the accumulation of said decolorizing agent in said bed.

JOHN J. SEIP.